No Printed Specification Available
9884X
J. Mc Clory,
Door Lock.
Patented July 2, 1836.
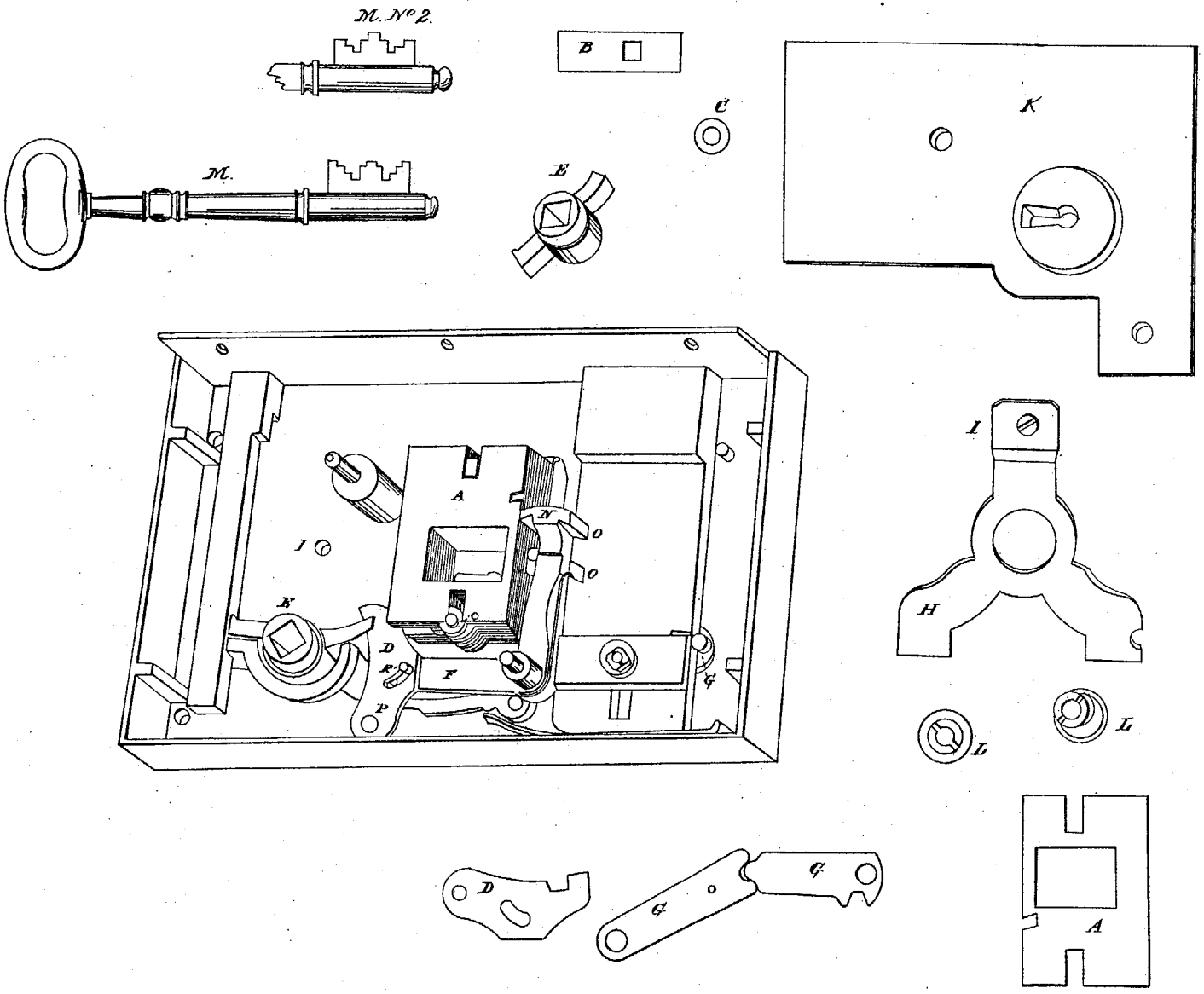
AM. PHOTO-LITHO. CO. N.Y. (OSBORNE'S PROCESS)

July 2. 1836

James McElroy New-York City

X 9884 Letters Patent

The schedule referred to in these Letters Patent and making part of the same containing a description in the words of the said James McElroy himself of his improvement in the Lock for Banks Stores Houses and for all other purposes.

To all to whom these presents shall come Be it known that I James McElroy of the City County and State of New York have invented a new and useful improvement in the Lock for Banks Stores Houses &c and that the following is a full true and exact description thereof when taken in connection with the drawing to which this specification refers. The stock or case is made similar to that of the common door Lock.

Within the case is placed a set of guards represented at AA each guard having a slot at each end through working on permanent studs. In the upper edge of each guard is a notch to receive the check N hereafter described. The notches are made at different distances from the end of the guard &c in making the lock the notches cannot be made until the peculiar form of the key is determined. Between every pair of guards is placed a piece of [illegible] at each end to enable the guards to slide independently of each other.

These guards are thrown horizontally back and forwards by the key M having a bit consisting of steps or a series of steps of different lengths corresponding in number with the guards in which they act. The check N turning vertically on a pin in the plate has upon its upper side a projection which rises into a corresponding notch O.O in the under side of the bolt and on the underside of the check is a projection which drops into the notches in the guards, when acted upon by the proper key. The lever D.D is for the purpose of lever-ing the outside knob. It works on a permanent stud P at one end. In the other end is a notch which is intended to secure one of the followers E. E. to which the outside knob is attached. F is that part of
the check (bent at a right angle with the part C) having a small
stump R. in it which enters a slot cut in the lever Q.Q. in such a
manner that, when the check is admitted into the notches in the guards
by the action of the key, the elbow F carrying the stump R. raises the lever
Q.Q. off the follower E and gives liberty to the outside knob to be acted
upon. The key M. is intended to lock and unlock the bolt. This it does
by acting upon the guards, and placing them in their proper position to
receive the check which is thrown into them by a spring. It then
acts upon the bolt and puts it in a locked or unlocked position and
secures it by replacing the guards. This is done by the key striking a plate
on the opposite side of the square and moving the guards back in a
body.

The night key M No 2 is similar to the other except that two of the
steps are taken off so that it will not act upon the bolt. This night
key has an advantage over all others in the circumstance that it is
as difficult to counterfeit it as the main key since it acts in the
same key hole and upon the same guards. By the use of this
key front door locks are rendered perfectly safe during the time the
bolt is withdrawn as the outside knob cannot be turned until all
the guards are ~~bolt~~ into their proper position. S S is a cap to secure
the upper follower E in its proper place. L is a cap which is placed
over the work of the lock. B. and C are the pieces of tin placed between
the guards that they may work independently of each other. G. G. are
the levers by which the key is enabled to shoot the bolt.

What I claim as my own invention and not previously known or used, in the above described lock is Firstly an improvement upon the guards heretofore made by which the bearded lever (described in my Patent of the 19 March 1836) are dispensed with. These guards have a cavity cut into them all and permit the key to move them in both directions in forming one revolution and then release the bolt, move it and again secure it. I claim second by the application of this principle to the night latch for front door

X 9884

227 lock by means of the tail T of the block to which lock upon the lever and release or secure the fastener of the outside block.

Witness
Geo G Warren
Richd Hines

Thos McCoy

Ex?
CJW.

788 mts

Drawing